United States Patent [19]
Bradner

[11] 3,903,645
[45] Sept. 9, 1975

[54] HYBRID SOYBEAN PRODUCTION

[75] Inventor: Norman R. Bradner, Storm Lake, Iowa

[73] Assignee: Pfizer Inc., New York, N.Y.

[22] Filed: Mar. 29, 1974

[21] Appl. No.: 456,314

[52] U.S. Cl. .................................. 47/58; 47/DIG. 1
[51] Int. Cl.[2] ........................................ A01H 1/02
[58] Field of Search .......................... 47/58, DIG. 1

[56] References Cited
UNITED STATES PATENTS

| | | | |
|---|---|---|---|
| 2,753,663 | 7/1956 | Jones | 47/58 |
| 3,570,181 | 3/1971 | Davis | 47/58 |
| 3,710,511 | 1/1973 | Patterson | 47/58 |
| 3,842,538 | 10/1974 | Barabas | 47/58 |

*Primary Examiner*—Robert E. Bagwill
*Attorney, Agent, or Firm*—Burns, Doane, Swecker & Mathis

[57] ABSTRACT

Heretofore there has been an unfilled need for an efficient process for the production of seed capable of growing $F_1$ hybrid soybean plants. The first commercially practicable solution to this need is described. A substantially uniform first population of atypical soybean plants having exposed floral stigmas and the propensity to yield seed of a small size is grown adjacent to a substantially uniform second population of soybean plants having the propensity to yield seed of a larger size. The soybean plants of the first population are capable of undergoing cross-pollination with the aid of pollen carrying insects as well as self-pollination. Following cross- and self-pollination and seed formation seed selectively is recovered from the plants of the first population, and is segregated on the basis of seed size with the relatively larger seed resulting from the cross-pollination being capable of growing $F_1$ hybrid soybean plants. In a preferred embodiment of the process the plants of the first population additionally exhibit a characteristic wherein the dehiscence of anther tissue to discharge pollen is delayed at least until the florets open, and/or produce less than the normal quantity of viable pollen commonly observed in soybean plants thereby tending to enhance the relative proportion of cross-pollination occurring in the first population. The relative purity of the resulting $F_1$ hybrid seed following separation on the basis of seed size can be confirmed by providing a recessive genetic gene marker (e.g. a particular flower color) in the first population of plants and a corresponding dominant gene marker in the second population plants. When cross-pollination occurs, the recessive marker which is perpetuated upon self-pollination is no longer observable. If desired the seed capable of growing $F_1$ hybrid plants may be used as foundation seed for the production of $F_2$ planting seed which continues to exhibit an appreciable degree of enhanced vigor and seed yield compared to standard later generation soybean varieties, following the self-pollination of same.

21 Claims, 2 Drawing Figures

PATENTED SEP 9 1975        3,903,645

HYBRID SOYBEAN PRODUCTION

BACKGROUND OF THE INVENTION

It has been recognized for many years that the hybridization of closely related plants results in offspring having a combination of desirable traits which previously were possessed separately by the parent plants. Certain hydrid plants have also possessed a vigor or heterosis which has rendered them of considerable economic importance.

While significant advances have been made in the production of hydrid sugar beets, hybrid corn (See U.S. Pat. No. 2,753,663 to Jones), hybrid sorghum, and hybrid alfalfa (See U.S. Pat. No. 3,570,181 to Davis) many economically important crops remain in which no commercially practicable breeding technique has been developed for the production of a hybrid. Obviously cross-pollination carried out by hand is not feasible for commercial production. Much of the difficulty experienced when attempts have been made to develop a hybrid of many crops can be traced to the diverse reproduction systems and modes of pollination encountered. Accordingly, each crop must be approached separately and its unique characteristics taken into consideration.

As reported in *Modern Soybean Production*, by Walter O. Scott and Samuel R. Aldrich, published by The Farm Quarterly, Cincinnati, Ohio 45210 in 1970, "The secret of producing hydrid soybean seed on a commercial scale is yet to be discovered."

Soybean plants (i.e. Glycine max plants) are recognized to be naturally self-pollinated plants which while being capable of undergoing cross-pollination rarely do so. Insects are reported by some researchers to carry pollen from one soybean plant to another and it generally is estimated that less than one percent of soybean seed formed in an open planting can be traced to cross-pollination, i.e. less than 1 percent of the soybean seed formed in an open planting is capable of producing $F_1$ hybrid soybean plants. See the articles by Elbert R. Jaycox entitled "Ecological Relationships between Honey Bees and Soybeans" appearing in the American Bee Journal, Vol. 110(8): 306–307 (August 1970), Vol. 110(9): 343–345 (September 1970) and Vol. 110(10): 383–385, (October 1970).

The relatively low proportion of cross-pollination commonly observed in soybean plants when grown in nature can be traced to the characteristic floral configuration exhibited by soybean plants. The pistillate (female) and staminate (male) elements of soybean flowers are normally present on the same plant and are located within perfect flowers which contain both elements in a juxtaposed relationship. The opening of the individual soybean flowers (florets) is believed to be triggered by the length of time the plant is exposed to light. However, the anthers and stigma continue to be tightly enclosed within petals (i.e. the portion of the flower known as the keel petals). When dehiscence of anther tissue occurs and pollen is shed from the anthers, it tends immediately to contact the stigma in the same floret and is retained there by the keel petals. A seed pod ultimately is formed from this fertilization assuming that the pollen does not abort.

Some researchers have reported the existence of a degree of male sterility in selected soybean plants. See, for instance:

1. "A Partially Male Sterile Strain of Soybeans", by C. E. Caviness, H. J. Walters, and D. L. Johnson, *Crop Science*, Vol. 10, p. 107–108, (Jan.-Feb. 1970), and
2. "Inheritance of a Male-Sterile Character in Soybeans", C. A. Brim and M. F. Young, *Crop Science*, Vol. 11 p. 564–566, (July-Aug. 1971).

Those skilled in the art nevertheless have continued to search for a commercially practicable process for producing seed capable of growing $F_1$ hybrid soybean plants.

It is an object of the invention to provide a commercially practicable process for the production of seed capable of growing $F_1$ hybrid soybean plants.

It is an object of the invention to provide a commercially practicable process for the production of seed capable of growing $F_2$ soybean plants.

It is an object of the invention to provide a process for the production of seed capable of the production of $F_1$ hybrid soybean plants wherein unique difficulties heretofor associated with the hybridization of soybean plants are effectively surmounted.

It is an object of the invention to provide a process for the production of seed capable of growing soybean plants which exhibit enhanced vigor and seed yield compared to standard later generation soybean varieties.

It is an object of the invention to provide a process for the production of seed capable of growing soybean plants which produce seed in an enhanced yield.

It is another object of the invention to provide a process for the production of seed capable of growing $F_1$ hybrid soybean plants to the substantial exclusion of off-types.

It is another object of the invention to provide a process for the production of seed capable of growing soybean plants which produce seed of a larger size than that resulting from the self-pollination of the female seed parent thereby further contributing to the enhanced seed yield achievable.

These and other objects as well as the scope, nature, and utilization of the invention will be apparent from the following detailed description and appended claims.

SUMMARY OF THE INVENTION

It has been found that a process for the efficient production of seed capable of growing $F_1$ hybrid soybean plants comprises:

a. growing a first substantially uniform population of soybean plants having an exposed floral stigma and the propensity to yield seed of a relatively small size upon self-pollination in pollinating proximity to a second substantially uniform population of soybean plants which have the propensity to yield seed of a relatively larger size upon self-pollination with the soybean plants of the first population being inherently capable of undergoing both cross-pollination and self-pollination and forming seed upon cross-pollination with pollen derived from the plants of the second population which generally is larger than seed formed upon self-pollination, b. randomly cross-pollinating the plants of the first population with pollen derived from the plants of the second population with the aid of pollen carrying insects and randomly self-pollinating plants of the first population with pollen derived from the first population, c. selectively recovering seed which is formed upon the plants of the first population, and d. physically segregating the seed recovered from the plants of the first population wherein relatively larger seed resulting from the cross-pollination which is capable of growing $F_1$ hybrid soybean plants is separated from relatively smaller seed resulting from the self-pollination.

DESCRIPTION OF PREFERRED EMBODIMENTS

The soybean plants of the first substantially uniform population are atypical soybean plants and have an exposed floral stigma upon the opening of the florets. These plants are inherently capable of undergoing a greater degree of cross-pollination than typical soybean plants and are also capable of undergoing self-pollination when grown in nature. The soybean plants of the first population additionally have the propensity to yield seed of a relatively small size when self-pollination occurs.

Figure 1:
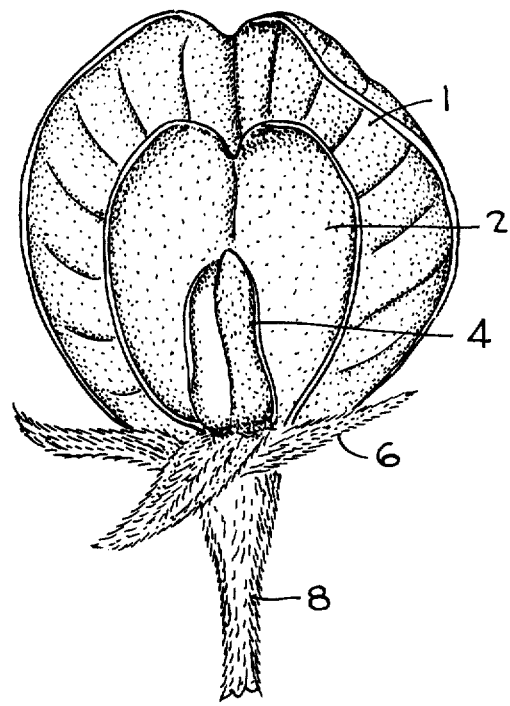
FIG. 1 is an enlarged schematic presentation of a typical soybean floret following the opening of the same wherein the pistillate and staminate elements (not shown) are tightly enclosed within the keel petals which never open.

In FIG. 1 is illustrated an enlarged view of a typical soybean floret. It comprises standard petals 1, wing petals 2, and keel petals 4. Also illustrated are sepals 6, and peduncle 8 upon which the usual pubescence is shown. The pistillate (female) and staminate (male) elements of the soybean flower are not shown and are tightly enclosed within the keel petals 4 even though the remainder of the floret has opened. The keel petals never open up to expose the female flower parts to visits by insects. A pollen carrying insect would have difficult access to the stigma thereby accounting for the relatively low degree of cross-pollination. Typical soybean plants wherein the stigma remains enclosed within the keel petals following the opening of the florets are not suitable for use in the first population.

Figure 2:
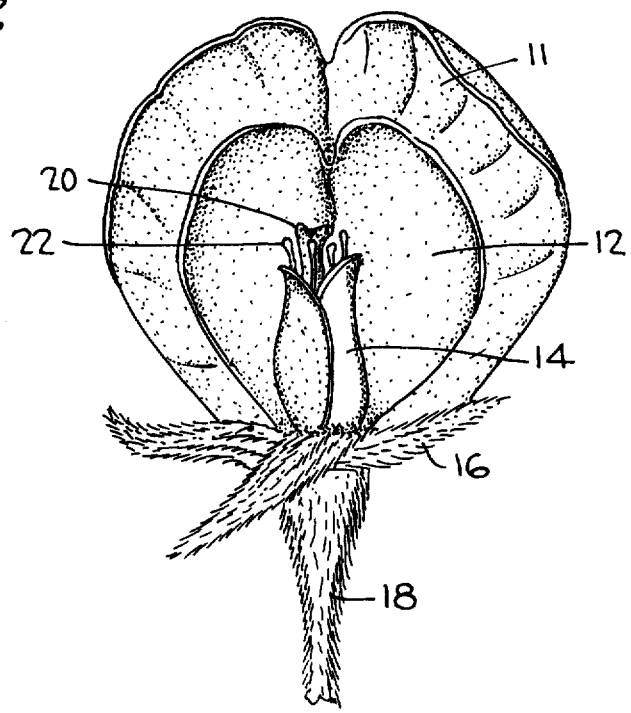
FIG. 2 is an enlarged schematic presentation of an atypical soybean floret having an exposed stigma. Soybean plants having this morphological characteristic are suitable for use in the formation of the substantially uniform population of soybean plants serving as the $F_1$ hybrid seed parents in the process of the present invention.

In FIG. 2 is illustrated an enlarged view of an atypical soybean floret. It comprises the usual standard petals 11, wing petals 12, and keel petals 14, sepals 16, and peduncle 18. The stigma 20 and anthers 22 are directly exposed to the atmosphere and protrude beyond the keel petals 14 which are at least partially opened to allow for the protrusion of the stigma 20. The protrusion of the stigma may be traced inter alia, to a larger than normal ovary. A pollen-carrying insect would have direct and ready access to the stigma thereby accounting for the increased degree of cross-pollination.

Soybean plants suitable for use in the first population may be derived from plants located by examining large populations of soybean plants of existing varieties for the requisite characteristics. For example, soybean plants having the required exposed floral stigma have been successfully isolated from populations of the Merit variety. The search for the soybean plants having an exposed floral stigma may be conducted at any time of the year when the soybean florets are open. The selection of suitable soybean plants having the requisite floral stigma is aided by the use of a magnifying lens to examine in detail florets soon after the opening of the same.

Once soybean plants having the requisite exposed floral stigma are located, they are tested for the reproducibility of this characteristic and are developed into a homogeneous stable line or strain through conventional plant breeding techniques which has a propensity to yield seed of a relatively small size upon self-pollination. More specifically, the atypical plant having an exposed stigma characteristic may be developed into a homogeneous line having this, as well as the small seed size characteristic, by selection from the segregating population. The small seeded lines can be developed from existing small seeded varieties by standard backcrossing techniques. Plants having exposed stigmas can be selected in $F_2$ populations of the small seeded lines, and be maintained by normal selfing of the homozygous condition. Representative small seeded varieties include: Merit, Norsoy, Seneca, Adams, and Plant Introduction (i.e. P.I.) Nos. 68.403, 70.077, 70.091, 70.241, 82.264, 85.505, 87.620, 96.162, 171.652, and 266.800A. Other small seeded varieties may be utilized as will be apparent to those skilled in the art.

The soybean plants of the second substantially uniform population are a homogeneous stable soybean line which has a propensity to yield seed of a relatively larger size upon self-pollination than that produced when self-pollination occurs in the plants of the first population. The plants of the second population may have the usual normal soybean floral configuration; however, the degree of cross-pollination achievable can be enhanced further if atypical soybean plants are selected which have anthers extending beyond the keel petals (i.e. are extruded). The plants of the second population preferably are good pollen producers and when serving as the pollen parent for seed produced upon the plants of the first population result in the production of an $F_1$ hybrid which exhibits a substantial degree of heterosis for seed yield. The soybean plants of the second population are also selected so that they bloom at approximately the same time as the soybean plants of the first population. Representative soybean plants from which the plants of the second population may be derived include the following large seeded varieties: Disoy, Sac, Portugal, Etum, Kanrich, and Plant Introduction (i.e. P.I.) Nos. 19.968, 70.243, 80.459, 85.441, 86.134-1, 89.162, 92.661, 196.160, and 290.149. Other large seeded varieties may be utilized as will be apparent to those skilled in the art.

It generally is recognized that some variation in seed size may be apparent in a given soybean line or variety. This variation in seed size can be traced at least in part to environmental conditions and the presence or absence of abundant moisture at the time of seed set. However, a given soybean line tends to produce mature seed of a relatively constant or typical size assuming the environmental conditions are constant. Not only is seed produced upon self-pollination of the plants of the second population which generally is larger than the produced upon self-pollination of the plants of the first population, but the seed produced upon the cross-pollination of the plants of the first population with pollen from the plants of the second population generally is larger than the seed formed thereon upon self-pollination. The seed formed upon cross-pollination tends to be intermediate in size between that of the parents. Relative seed sizes for the first and second populations are selected so that an adequate size differential exists between the seed produced upon the plants of the first population to facilitate expeditious physical segregation of the same (as described hereafter) depending upon whether cross-pollination or self-pollination produced the seed. For instance, the plants of the second population may produce an average seed size upon self-pollination which exceeds that produced upon self-pollination of the plants of the first population by at least 10 grams per 100 seeds.

Prior to planting, the seed utilized to form the plants of the first and second populations preferably is innoculated with nitrogenfixing bacteria (i.e. Rhizobia) in accordance with conventional seed preparation techniques particularly if planted where soybeans have not been grown previously.

In accordance with the process of the present invention the plants of the first substantially uniform population are grown in pollinating proximity to the plants of the second substantially uniform population. The proximity of the two populations must be of sufficient closeness that cross-pollination of the first population may be carried out by the aid of pollen carrying insects. In a preferred embodiment of the process the soybean plants of the first and second populations are grown in alternating strips. The alternating strips may consist of one or more adjoining rows of the plants of each population. A particularly preferred planting pattern utilizes the alternation of four rows of the plants of the first population adjacent to two rows of the plants of the second population. If desired, a row may be left blank between each population to better facilitate the selective seed harvest (described hereafter). Usual soybean planting techniques (e.g. row widths of about 20 to 40 inches) may be utilized within a given population of the soybean plants.

The soybean plants of the first population are randomly cross-pollinated with pollen derived from plants of the second population with the aid of pollen carrying insects and are randomly self-pollinated with pollen derived from the first population. As the insects forage for nectar and pollen, the pollen required for cross-pollination is transported. The plants of the second population with only negligible exceptions are self-pollinated. Representative pollen carrying insects for use in transporting the pollen are bees, such as honey bees, bumble bees, leafcutter bees, solitary bees, etc. Insects such as thrips may also play a roll as pollen vectors in effecting the desired cross-pollination. The exposed stigmas of the plants of the first population facilitate a substantially increased amount of cross-pollination than would otherwise occur if the plants of the first population had a typical floral arrangement.

In a preferred embodiment of the process of the present invention the soybean plants of the first population also exhibit the characteristic wherein the dehiscence of anther tissue to discharge pollen is delayed at least until the florets open (e.g. until after the florets open). Soybean plants exhibiting this characteristic may be located, inter alia, by visually examining populations of soybean plants having exposed stigmas as soon as the florets open. Those plants having the desired delayed dehiscence can be found with the use of a magnifying lens while searching for evidence of anthers which show no evidence of the characteristic bursting along the dehiscence line of the same. This delayed dehiscence characteristic appears to be manifest as a genetic recessive trait. Once soybean plants having the requisite characteristic are located, they are developed into the required homogeneous stable line or strain through conventional plant breeding techniques, i.e. breeding followed by selection. The delayed dehiscence characteristic tends to enhance the relative proportion of cross-pollination occurring in the first population and precludes self-pollination prior to exposure of the stigma when the floret opens.

In another preferred embodiment of the process of the present invention the soybean plants of the first population also are partially male sterile and produce less than the normal quantity of viable pollen commonly observed in soybean plants thereby tending to enhance the relative proportion of cross-pollination occurring in the first population. Every effort is made to select plants which continue to exhibit a relatively high degree of female fertility. The partial male sterility utilized may be genetic or cytoplasmic in nature. Plants having this partial sterility are located by examing large populations of soybean plants of existing varieties for pollen content and/or viability. As reported earlier, partially sterile strains previously have been observed in soybeans. When the sterility is genetically controlled the gene for partial male sterility is transferred into the soybean plants of the first population in accordance with standard plant breeding techniques. When plants of the first population are partially male sterile it is preferred that the plants of the second population contain a restorer factor or gene so that all of the $F_1$ hybrid plants produced are completely male fertile (i.e. the plants of the second population are homozygous dominant for fertility restoration). In a particularly preferred embodiment of the process the soybean plants of the first population exhibit both the delayed dehiscence characteristic and the partial male sterility characteristic.

In a further preferred embodiment of the process of the present invention the soybean plants of the first population additionally include a genetic marker which visually can be observed in progeny plants when self-pollination occurs within the plants of the first population and which is absent in the progeny plants when cross-pollination occurs. The genetic marker can take the form of a recessive gene which no longer manifests itself when a dominant gene for the characteristic in question is derived from the plants of the second population upon cross-pollination. The plants of first and second populations should be homozygous for the presence and absence of the characteristic in question. The genetic marker may be selected from any one of a variety of recessive characteristics and preferably is readily observable in the progeny should self-pollination occur. For instance, the genetic marker can be a distinctive pubescence color (e.g. gray pubescence vs. tawny pubescence), flower color (e.g. white flowers vs. purple flowers), seed coat color (e.g. yellow vs. black seed coat color), distinctive seed appearance (e.g. plain yellow vs. mottled yellow appearance), and hilum appearance, (e.g. yellow vs. black hilum), etc. The preferred genetic markers are pubescence color and flower color. The use of a genetic marker enables one readily to determine the $F_1$ purity of the seed harvested from the plants of the first population following physical separation of the same on the basis of size (described hereafter). For instance, at least a portion of the relatively larger seed resulting from the separation may be grown, and the purity of the larger seed with respect to $F_1$ hybrid content determined by observing the incidence of the dominant genetic marker in the resulting plants. Alternatively, the incidence of the recessive genetic marker can be observed as an indication of the proportion of seed resulting from self-pollination. If desired, the observation for the marker may be done mechanically, e.g. by use of a photoelectric cell.

The soybean lines of the first and second populations preferably are also bred to exhibit adequate resistance to disease, insects, and lodging.

Following seed set and seed maturation the seed which has formed upon the plants of the first population is selectively harvested to the substantial exclusion of seed which has formed upon the plants of the second population. The seed which has formed upon the plants of the second population may also be selectively recovered and utilized primarily for non-planting purposes. Harvesting and seed removal from the pods is carried out in the usual manner. Selective harvesting can be carried out with ease when the plants of the first and second populations are separated by a blank row. The seed produced upon the plants of the first population will be in two generally different sizes with the smaller seed resulting from self-pollination and the larger seed resulting from cross-pollination. In a preferred embodiment of the process the average seed size resulting from the cross-pollination exceeds that produced by self-pollination by at least 5 grams per 100 seeds.

The seed from the plants of the first population is physically segregated wherein the relatively larger seed resulting from cross-pollination which is capable of growing $F_1$ hybrid soybean plants is separated from the relatively smaller seed resulting from self-pollination. The physical separation conveniently may be made in any one of a variety apparatus commonly utilized for the cleaning and size grading of seeds. Representative apparatus include screens, indent and cylinder separators, gravity tables, etc. If the genetic marker system previously discussed should indicate that the $F_1$ hybrid seed resulting from the separation is not sufficiently pure, an additional more refined seed size separation may be carried out. For instance, during the winter a sample of the seed may be grown out in a greenhouse and the incidence of the marker determined.

In a representative separation the seed for planting the first population will pass a fourteen sixty-fourths inch round hole screen and collect on a twelve sixty-fourths inch round hole screen, the seed for planting the second population will pass a twenty-four sixty-fourths inch round hole screen and collect on a twenty sixty-fourths inch round hole screen, and the seed capable of growing $F_1$ hybrid soybean plants pass a twenty-four sixty-fourths inch round hole screen and collect on a sixteen sixty-fourths inch round hole screen. Any seed from the female parent which passes the sixteen sixty-fourths inch screen is assumed to be the result of self-pollination.

The relatively larger seed resulting from cross-pollination may be planted directly to yield soybeans in enhanced yields, or advantageously used as foundation seed for the production of planting seed (i.e. $F_2$ seed) which continues to exhibit an appreciable degree of enhanced vigor (i.e. heterosis with respect to seed yield) following the self-pollination of the same. Normally approximately one-half of seed production heterosis exhibited in the $F_1$ hybrid is present in the $F_2$ generation following self-pollination. In this manner the seed readily may be multiplied to produce a commercially superior planting seed.

The present process is believed to offer the first commercially practicable route to the production of seed capable of growing $F_1$ hybrid soybean plants. Even if the plants of the first population are fully male fertile and the anther tissue dehisces prior to the opening of the floret, approximately 1 to 15 percent of the seed formed thereon is of the larger size resulting from cross-pollination. When the plants of the first population are fully male fertile and exhibit the delayed dehiscence characteristic in combination with the exposed stigma characteristic, approximately 10 to 30 percent of the seed formed thereon is of the larger size resulting from cross-pollination. When the plants of the first population are also partially male sterile in addition to exhibiting the delayed dehiscence characteristic, then approximately 50 to 80 percent of the seed formed thereon is of the larger size resulting from cross-pollination. These percentages can be compared to usual insignificant amounts (i.e. less than one percent) of cross-pollination which occurs in the open planting of existing soybean varieties. Following separation on the basis of seed size the resulting seed can be provided on a large scale in a form wherein at least 75 percent thereof is capable of producing $F_1$ hybrid soybean plants, and preferably at least 95 percent thereof is capable of producing $F_1$ hybrid soybean plants.

The ability for the farmer to plant either the $F_1$ hybrid soybean seed, or the $F_2$ seed resulting from the self-pollination of the $F_1$ seed offers significant advantages. An increased yield over existing varieties of 15 to 25 percent can be expected when the $F_1$ hybrid soybean seed is planted, and an increased yield over existing varieties of about 7 to 12 percent can be expected when the $F_2$ seed is planted.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for the efficient production of seed capable of growing $F_1$ hybrid soybean plants comprising:

a. growing a first substantially uniform population of soybean plants having an exposed floral stigma and the propensity to yield seed of a relatively small size upon self-pollination in pollinating proximity to a second substantially uniform population of soybean plants which have the propensity to yield seed of a relatively larger size upon self-pollination with said soybean plants of said first population being inherently capable of undergoing both cross-pollination and self-pollination and forming seed upon cross-pollination with pollen derived from said plants of said second population which generally is larger than seed formed upon self-pollination.

b. randomly cross-pollinating said plants of said first population with pollen derived from said plants of said second population with the aid of pollen carrying insects and randomly self-pollinating plants of said first population with pollen derived from said first population, c. selectively recovering seed which is formed upon said plants of said first population, and d. physically segregating said seed recovered from said plants of said first population wherein relatively larger seed resulting from said cross-pollination which is capable of growing $F_1$ hybrid soybean plants is separated from relatively smaller seed resulting from said self-pollination.

2. A process for the efficient production of seed capable of growing $F_1$ hybrid soybean plants according to claim 1 wherein said plants of said first substantially uniform population additionally exhibit a characteristic wherein the dehiscence of anther tissue to discharge pollen is delayed at least until the florets open thereby tending to enhance the relative proportion of cross-pollination occurring in said first population.

3. A process for the efficient production of seed capable of growing $F_1$ hybrid soybean plants according to claim 1 wherein said plants of said first substantially uniform population additionally produce less than the normal quantity of viable pollen thereby tending to enhance the relative proportion of cross-pollination occuring in said first population.

4. A process for the efficient production of seed capable of growing $F_1$ hybrid soybean plants according to claim 1 wherein said plants of said first and second populations are grown in alternating strips.

5. A process for the efficient production of seed capable of growing $F_1$ hybrid soybean plants according to claim 1 which includes the additional step of selectively recovering seed which has formed upon said plants of said second population.

6. A process for the efficient production of seed capable of growing $F_1$ hybrid soybean plants according to claim 1 wherein said pollen carrying insects are bees.

7. A process for the efficient production of seed capable of growing $F_1$ hybrid soybean plants according to claim 1 wherein said plants of said first population which are grown in step (a) additionally contain a genetic marker which visually can be observed in progeny plants when self-pollination occurs within the plants of the first population in step (b) and which is absent in the progeny plants when cross-pollination occurs within the plants of the first population in step (b).

8. A process for the efficient production of seed capable of growing $F_1$ hybrid soybean plants according to claim 1 wherein the average seed size produced upon self-pollination of said soybean plants of said second population exceeds that of said first population by at least 10 grams per 100 seeds.

9. A process for the efficient production of seed capable of growing $F_1$ hybrid soybean plants according to claim 1 wherein at least a portion of said relatively larger seed obtained from the physical segregation of step (d) additionally is planted, the resulting plants allowed to self-pollinate, and the thus formed $F_2$ seed harvested.

10. A process for the efficient production of seed capable of growing $F_1$ hybrid soybean plants comprising:

a. growing a first substantially uniform population of soybean plants having an exposed floral stigma, the characteristic wherein the dehiscence of anther tissue to discharge pollen is delayed at least until the florets open, and the propensity to yield seed of a relatively small size upon self-pollination in pollinating proximity to a second substantially uniform population of soybean plants which have the propensity to yield seed of a relatively larger size upon self-pollination, with said soybean plants of said first population being inherently capable of undergoing both cross-pollination and self- pollination and forming seed upon cross-pollination with pollen derived from said plants of said second population which generally is larger than seed formed upon self-pollination, and with said plants of said first population and said plants of said second population being grown in alternating strips, b. randomly cross-pollinating said plants of said first population with pollen derived from said plants of said second population with the aid of bees and randomly self-pollinating plants of said first population with pollen derived from said first population, c. selectively recovering seed which is formed upon said plants of said first population, d. selectively recovering seed which is formed upon said plants of said second population, e. physically segregating said seed recovered from said plants of said first population wherein relatively larger seed resulting from said cross-pollination which is capable of growing $F_1$ hybrid soybean plants is separated from relatively smaller seed resulting from said self-pollination.

11. A process for the efficient production of seed capable of growing $F_1$ hybrid soybean plants according to claim 10 wherein said plants of said first substantially uniform population produce less than the normal quantity of viable pollen thereby tending to enhance the relative proportion of cross-pollination occurring in said first population.

12. A process for the efficient production of seed capable of growing $F_1$ hybrid soybean plants according to claim 10 wherein said plants of said first population which are grown in step (a) additionally contain a genetic marker which visually can be observed in progeny plants when self-pollination occurs within the plants of the first population in step (b) and which is absent in the progeny plants when cross-pollination occurs within the plants of the first population in step (b).

13. A process for the efficient production of seed capable of growing $F_1$ hybrid soybean plants according to claim 12 wherein said genetic marker is a distinctive pubescence characteristic.

14. A process for the efficient production of seed capable of growing $F_1$ hybrid soybean plants according to claim 12 wherein said genetic marker is a distinctive flower color.

15. A process for the efficient production of seed capable of growing $F_1$ hybrid soybean plants according to claim 10 wherein the average seed size produced upon self-pollination of said soybean plants of said second population exceeds that of said first population by at least 10 grams per 100 seeds.

16. A process for the efficient production of seed capable of growing $F_1$ hybrid soybean plants according to claim 10 wherein at least a portion of said relatively larger seed obtained from the physical segregation of step (e) additionally is planted, the resulting plants allowed to self-pollinate, and the thus formed $F_2$ seed harvested.

17. A process for the efficient production of seed capable of growing $F_1$ hybrid soybean plants comprising:
   a. growing a first substantially uniform population of soybean plants having an exposed floral stigma, the characteristic wherein the dehiscence of another tissue to discharge pollen is delayed at least until the florets open, the characteristic of producing less than the normal quantity of viable pollen commonly observed in soybean plants, a genetic marker which visually can be observed in progeny plants when self-pollination occurs, and the propensity to yield seed of a relatively small size upon self-pollination in pollinating proximity to a second substantially uniform population of soybean plants which have the propensity to yield seed of a relatively larger size upon self-pollination, with said soybean plants of said first population being inherently capable of undergoing both cross-pollination and self-pollination and forming seed upon cross-pollination with pollen derived from said plants of said second population which generally is larger than seed formed upon self-pollination and with the seed resulting from said cross-pollination yielding progeny which lack said genetic marker, and with said plants of said first population and said plants of said second population being grown in alternating strips,
   b. randomly cross-pollinating said plants of said first population with pollen derived from said plants of said second population with the aid of bees and randomly self-pollinating plants of said first population with pollen derived from said first population,
   c. selectively recovering seed which is formed upon said plants of said first population,
   d. selectively recovering seed which is formed upon said plants of said second population,
   e. physically segregating said seed recovered from said plants of said first population wherein relatively larger seed resulting from said cross-pollination which is capable of growing $F_1$ hybrid soybean plants is separated from relatively smaller seed resulting from said self-pollination,
   f. growing at least a portion of said relatively larger seed resulting from said separation of step (e), and
   g. determining the purity of said relatively larger seed with respect to $F_1$ hybrid content by observing the incidence of a genetic marker in the resulting plants.

18. A process for the efficient production of seed capable of growing $F_1$ hybrid soybean plants according to claim 17 wherein said genetic marker is a distinctive pubescence characteristic.

19. A process for the efficient production of seed capable of growing $F_1$ hybrid soybean plants according to claim 17 wherein said genetic marker is a distinctive flower color.

20. A process for the efficient production of seed capable of growing $F_1$ hybrid soybean plants according to claim 17 wherein the average seed size produced upon self-pollination of said soybean plant of said second population exceeds that of said first population by at least 10 grams per 100 seeds.

21. A process for the efficient production of seed capable of growing $F_1$ hybrid soybean plants according to claim 17 wherein at least a portion of said relatively larger seed obtained from the physical segregation of step (e) additionally is planted, the resulting plants allowed to self-pollinate, and the thus formed $F_2$ seed harvested.

* * * * *